UNITED STATES PATENT OFFICE.

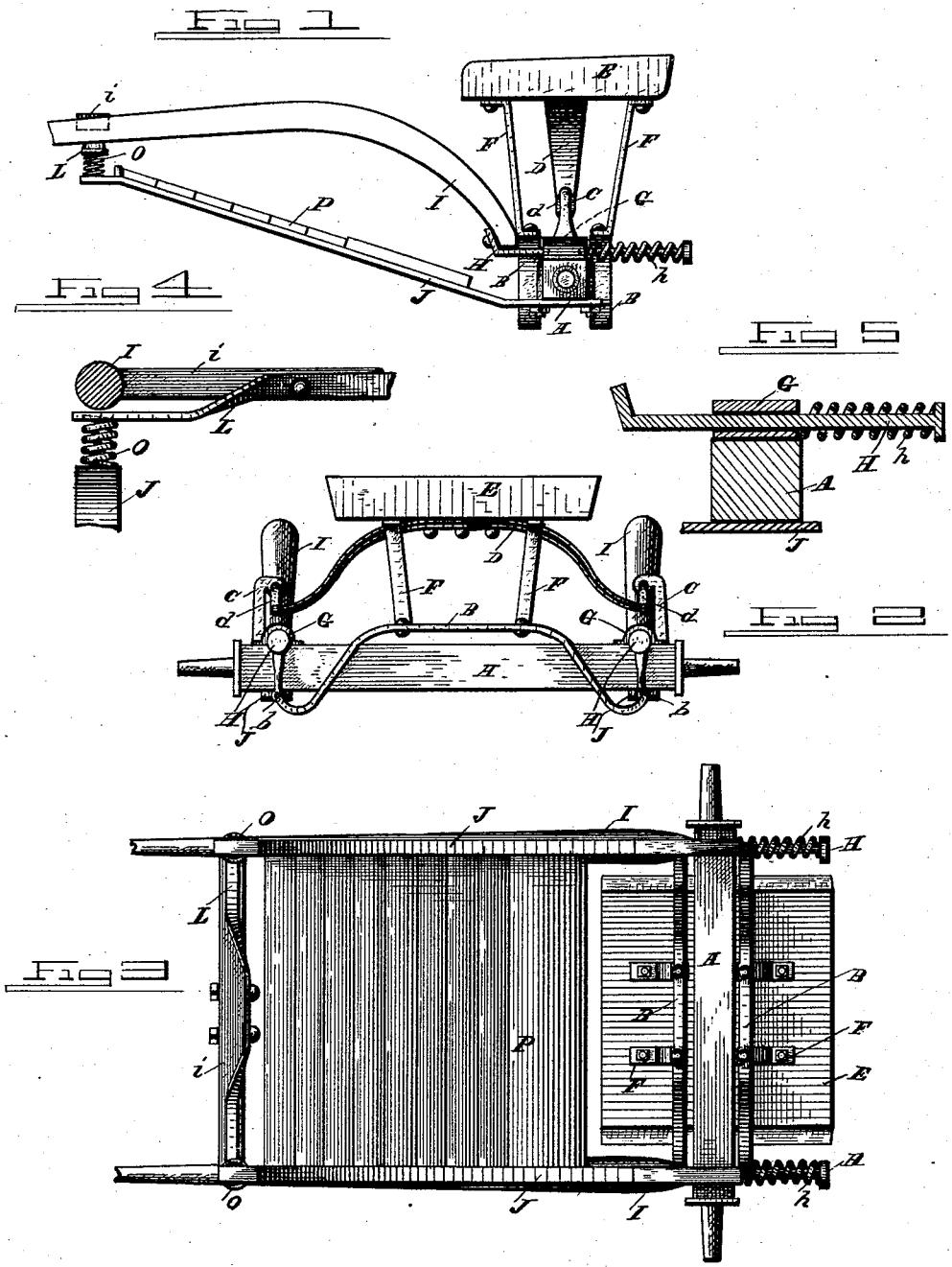

SAMUEL C. WHARTON, OF SOUTH BEND, INDIANA.

SULKY.

SPECIFICATION forming part of Letters Patent No. 455,781, dated July 14, 1891.

Application filed November 7, 1890. Serial No. 370,702. (No model.)

*To all whom it may concern:*

Be it known that I, SAMUEL C. WHARTON, of South Bend, in the county of St. Joseph and State of Indiana, have invented certain new and useful Improvements in Sulkies; and I do hereby declare that the following is a full, clear, and exact description thereof, reference being had to the accompanying drawings, and to the letters of reference marked thereon, which form part of this specification, in which—

Figure 1 is a side elevation of my improved sulky, the wheels being removed. Fig. 2 is a rear view thereof. Fig. 3 is a bottom view. Figs. 4 and 5 are details.

This invention is an improvement in two-wheeled vehicles; and its objects are to take up or compensate for the horse motion of the shafts and to mount the body on spring-supports independently of the shafts; and to these ends it consists in the novel construction and combination of parts hereinafter clearly described and claimed.

Referring to the drawings by letter, A designates the axle.

B B designate semi-elliptic or box springs suspended parallel with the axle and on opposite sides thereof by hangers $b$ $b$, clipped to the axle, as shown.

C C designate arms secured to the axle near the skeins thereof and rising therefrom, and D is a semi-elliptic spring suspended between and from said arms by hangers $d$ $d$ and standing just above the axle and supporting the seat E, as indicated.

F F are strap-irons attached to the front and rear edges of the seat by their upper ends and connected by their lower ends to springs B B, by which undue tilting of the seat forward or backward is prevented and strain on spring D partly relieved.

G G designate metal plates fixed to the axle in side arms C and perforated transversely to the axle for the passage of rods or irons H H, to the front ends of which the rear edges of the thills I I are secured, and $h$ $h$ are coiled springs on rods H H, interposed between the plates and pins or heads on the rear ends of the iron, as shown, so that when the thills are pulled forward the springs $h$ are compressed, thus cushioning the draft-strain between the thills and axle.

J J designate strap-irons, the lower ends of which are clipped or otherwise secured to the axle, and which project forwardly and upwardly toward the thills. The front ends of said straps are connected directly or indirectly to and supported by a semi-elliptic bow-spring L, the ends of which are attached to the ends of straps J, but are twisted so that the central portion thereof stands vertically edgewise, as shown. Spring L is connected at center to the cross-piece of the thills I, and thus suspends the body from the thills, and the draft-strain is transmitted from the thills through spring L and straps J to the axle. Short coiled springs O O are preferably interposed between and connect the ends of spring L and straps J, by which both lateral and vertical vibration of the thills will be compensated for. The shafts thus have a double spring connection to the axle and all horse motion will be compensated for, and the seat is independent of the flooring or bottom P, which is supported on straps J, and is very smooth and easy-riding.

Having thus described my invention, I claim—

1. The combination of the axle and thills and plates attached to the axle with the irons connected to the rear ends of the thills and projecting in rear of the axle and loosely through the plates thereon, and springs on said rods interposed between the rear ends thereof and the axle, for the purpose and substantially as described.

2. The combination of the axle, seat, and thills with the straps connected at their rear ends to the axle, and the twisted spring L, connected at its extremities to the front ends of the straps and at center to the cross-piece of the thills, substantially as set forth.

3. The combination of the axle, seat, and thills with the straps J J, connected to the axle their rear ends, the twisted spring L, connected at center to the cross-piece of the thills, and the springs interposed between and connecting the ends of spring L with the forward extremities of the straps, substantially as specified.

4. The combination of the axle, the springs B B on opposite sides thereof, and the springs D, suspended above the axle from arms rising therefrom, with the seat attached to and supported on spring D, and the straps connecting the seat to springs B B, substantially as specified.

5. The combination of the axle, seat, and thills, the irons H, attached to the rear ends of the thills loosely connected to the axle, and the springs on said irons in rear of the axle, with the straps J J, attached to the axle and projecting forwardly, and the spring L, connecting the front ends of said straps and connected to the thills, substantially as set forth.

In testimony that I claim the foregoing as my own I affix my signature in presence of two witnesses.

SAMUEL C. WHARTON.

Witnesses:
JAMES DUSHANE,
JEANIE ANDERSON.